Feb. 11, 1930.  E. R. WHITNEY  1,746,753
ARTIFICIAL BAIT
Filed July 24, 1928   2 Sheets-Sheet 1
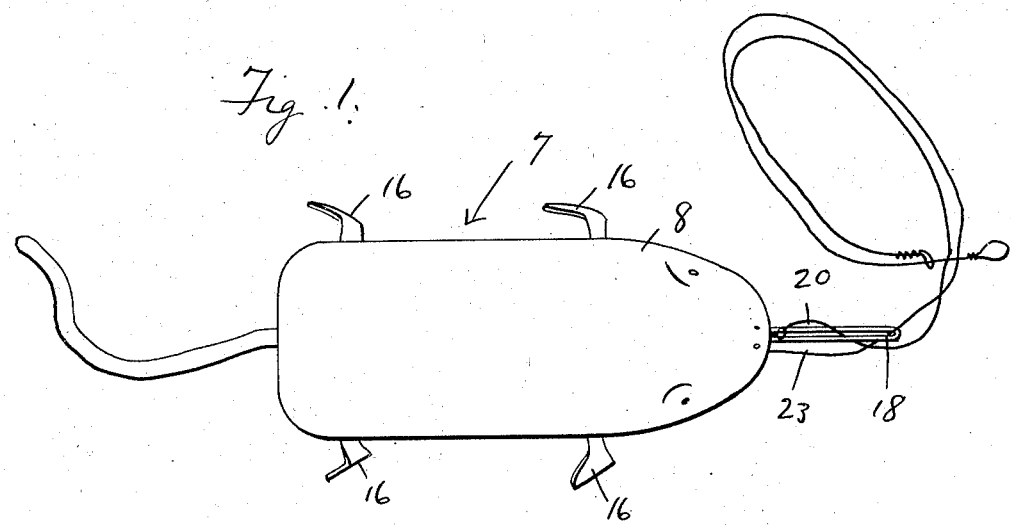
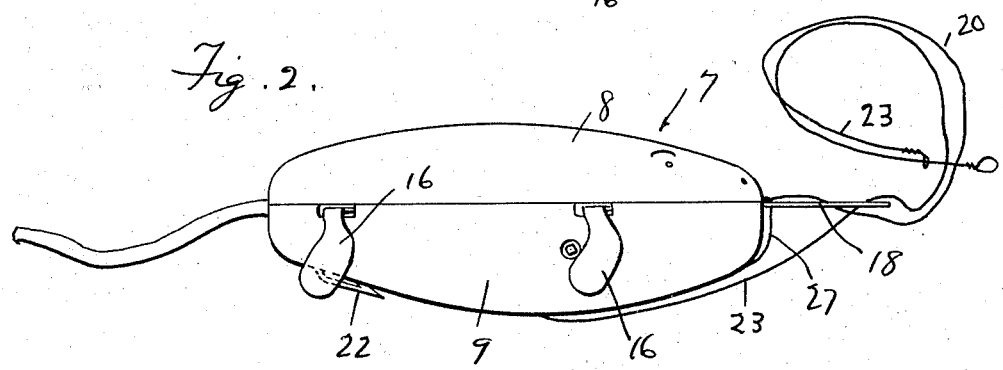
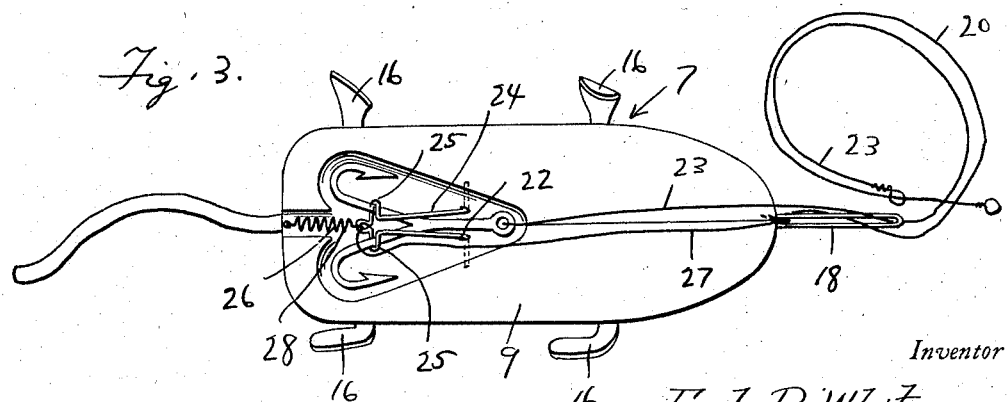
Inventor
Earl R. Whitney
By Clarence A. O'Brien
Attorney

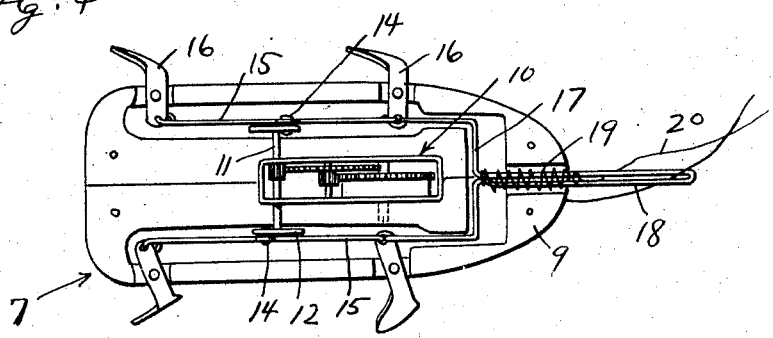
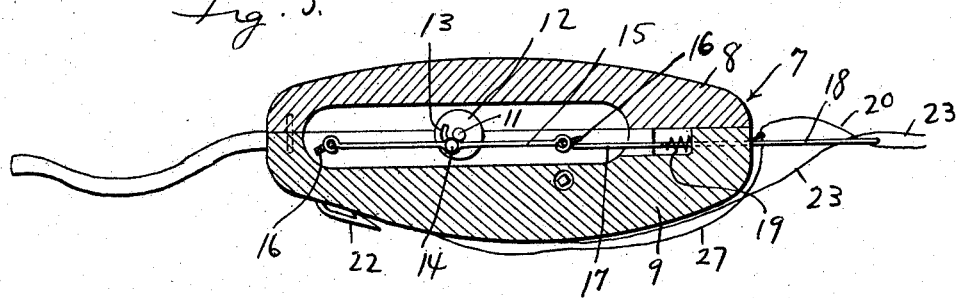
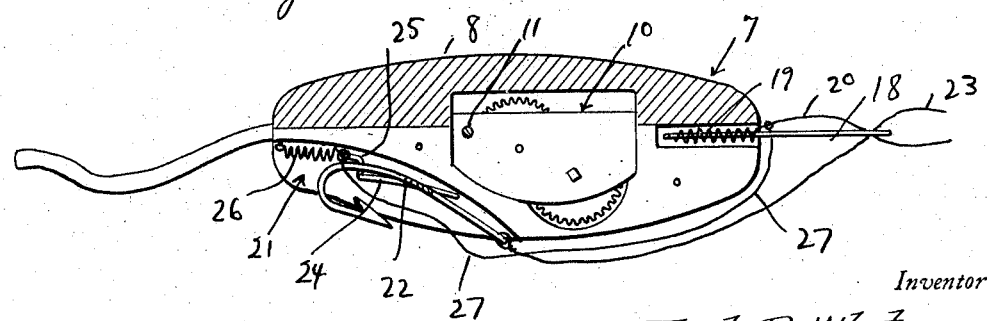

Patented Feb. 11, 1930

1,746,753

UNITED STATES PATENT OFFICE

EARL R. WHITNEY, OF KOOSKIA, IDAHO, ASSIGNOR OF ONE-THIRD TO STENGRIM ALSETH AND ONE-THIRD TO RUDOLPH E. STROM, BOTH OF OAKLAND, CALIFORNIA

ARTIFICIAL BAIT

Application filed July 24, 1928. Serial No. 295,015.

This invention relates to an improved artificial bait for fishing, and it has more particular reference to that species which is in the form of an imitation mouse. More specifically stated, the invention covers an artificial bait whose body portion is fashioned to resemble a mouse, the same being equipped with paddle-like fins, or legs, actuated by a spring motor or the equivalent, whereby to permit the bait to be life-like in attraction and capable of more readily attracting the catch.

The invention is also characterized by numerous other structural features; for example, a manually controlled trip for setting the motor into operation after the bait has been placed in the water, and a hook, which is associated with the body in such a way as to guard against accumulation of weeds thereon.

Other features and advantages of the invention will become more readily apparent from the following description and drawings.

In the drawings:

Figure 1 is a top plan view of a bait constructed in accordance with the invention.

Figure 2 is a side elevational view of the same.

Figure 3 is a bottom plan view.

Figure 4 is a top view of the lower section of the body, the upper section of the body being removed to expose the internal details.

Figure 5 is a longitudinal sectional view, through the structure.

Figure 6 is a similar view, detailing the hook and its retaining and releasing means.

Referring now to the drawings by reference numerals, it will be observed that the body is generally designated by the reference character 7, and is of such buoyant material. It is composed of upper and lower portions 8 and 9 tapered to permit the complete body to have the general appearance of a mouse. The body is recessed to accommodate an appropriately mounted miniature, spring motor, generally represented by the reference character 10. Associated with the motor and the lower section of the body is a pinion driven shaft 11 having disc-like heads 12, on its opposite ends. These heads are provided with arcuate slots 13 as shown in Figure 5, which are connected with pins 14 on reciprocatory connecting rods 15, located in appropriate grooves and operatively connected with the pivoted imitation legs 16. The legs are pivoted in openings in the body and the extending portions thereof are of paddle like construction so as to properly propel the body through the water.

Obviously, when the motor is in operation, the rods 15 are worked back and forth through the pin and slot connections with the heads 12, whereby to, in turn, actuate the paddles. Attention is invited to the fact, however, that the loose pin and slot connection between the rods and heads 12 permits the legs to pull back against the body to prevent breakage when resisted by the caught fish. Obviously, when the catch is made, the fish is liable to go in a direction opposite to the direction of movement of the artificial bait, and this loose pin and slot connection permits the paddles to swing closely in and against the body so as to prevent them from being broken off.

Closely associated with the details just described is a substantially U-shaped trip 17, whose arms are disposed against the forward legs or paddles to normally maintain these against movement and to hold the motor set, during the time of placement of the bait in the water.

The trip arms may engage above or below the legs as shown in Figures 4 and 5 respectively. When, however, the trip is moved out of the path of movement of these arms, their action is thus unobstructed and the motor is set in operation. Thus, the trip includes an extension 18 extending through an opening in the forward portion of the body and the coil spring 19 is anchored to the inner end of this extension and is wound around it, and a trip cord is connected to the spring.

By giving a quick jerk to the cord 20, the trip is released and the motor is in turn released to drive the bait through the water in a life-like manner. The movement of the legs in this connection is peculiar, owing to the eccentric pin and slot connection of the reciprocatory operating rod with the pivotally mounted paddle like legs.

Attention is now invited more particularly to Figures 3 and 6, wherein the hook structure is detailed. It will be noted that the underside of the body is formed with a recess 21 forming a pocket for the reception of the hook 22. The hook is of ordinary construction. Attached to the hook is a pull cord 23, which extends forwardly and through the loop like extension 18, where it is capable of individual operation. The hook is normally nested in the pocket, since it is releasably connected with a swingable resilient retainer 24 of the type seen in Figure 3. This retainer embodies a spring arm having keepers 25, and a coil spring 26 is attached to the swingable end of the retainer. The opposite ends of the arms are embedded in the body for pivotal mounting as detailed in Figure 3. The shank of the hook is snapped between the arms of the retainer and the split ends or fork portions of the hook are received in the keeper seat 25. The spring 26 normally holds the retainer as well as the hook nested in the pocket 21 as represented in Figure 6.

A short section of cord or the like 27 is connected with the aforesaid pull cord 20 and extends underneath the body, where it is connected with a spring 26 and an eye 28, on the swingable end of the retainer 24. Thus, when the cord is pulled to release the motor, a forward pull is exerted upon the section 27, thus pulling inwardly and outwardly upon the retainer and spring 26, and pulling the hook out of the pocket to place it in readiness for the catch. When the catch is made, sudden pull is exerted upon the cord 23, in order to pull the hook out of the retainer and to allow it to swing free in the water.

From the foregoing description it will be seen that the gist of the idea is in providing an artificial buoyant bait characterized by the presence of a miniature spring motor having operating connection with paddle like legs and feet, whereby to propel the bait in the water to give it a life-like action. The motor is normally held set against operation by a manually releasable trip actuated through the medium of a pull cord or the like after the bait has been placed in the water. In addition, there is the normally nested hook which is substantially concealed in a pocket in the body to prevent the accumulation of weeds. When desired, however, the hook can be ejected or drawn out from the pocket to place it in position for the "catch."

Then, after the catch is made, the hook may be swung free from the retainer to facilitate the haul, and subsequent removal.

It is thought that persons familiar with inventions of this class will be able to obtain a clear understanding of the same, after considering the description in connection with the drawings. Therefore, a more lengthy description is regarded unnecessary.

Minor changes in the shape, size and arrangement of parts coming within the field of invention claimed may be resorted to, if desired.

I claim:

1. An artificial bait of the class described comprising a mechanical imitation mouse having a recess providing a hook receiving pocket, and means for holding the hook in said pocket to prevent accumulation of weeds on the hooks.

2. An artificial bait comprising a mechanical imitation mouse adapted to propel itself through the water, said mouse having a body including a recess in its underside forming a pocket, a spring retainer in said pocket, and a hook releasably connected with the said spring retainer.

3. An artificial bait comprising a mechanical self propelled imitation mouse including a body having a pocket in its under side, a swingably mounted resilient retainer in said pocket, a spring connected with the retainer and anchored in said pocket, means for swinging the retainer out of the pocket, a hook releasably connected with the retainer, and means for releasing the hook from the retainer.

In testimony whereof I affix my signature.

EARL R. WHITNEY.